(12) United States Patent
Aoki

(10) Patent No.: US 8,599,389 B2
(45) Date of Patent: Dec. 3, 2013

(54) PAGE DESCRIPTION DATA PROCESSING APPARATUS, PAGE DESCRIPTION DATA PROCESSING METHOD, PRINT PRODUCING METHOD, AND RECORDING MEDIUM

(75) Inventor: Yasuharu Aoki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 100 days.

(21) Appl. No.: 13/406,231

(22) Filed: Feb. 27, 2012

(65) Prior Publication Data
US 2012/0224219 A1 Sep. 6, 2012

(30) Foreign Application Priority Data

Mar. 2, 2011 (JP) ................................. 2011-044906

(51) Int. Cl.
*G06F 3/12* (2006.01)
*G06F 17/24* (2006.01)

(52) U.S. Cl.
USPC ............. 358/1.1; 358/1.9; 358/453; 715/276; 382/282; 382/293; 382/294

(58) Field of Classification Search
USPC ........... 358/1.1, 1.9, 1.11, 453; 715/276, 234, 715/230, 249; 345/443; 382/282, 284, 293, 382/294
See application file for complete search history.

(56) References Cited

U.S. PATENT DOCUMENTS

| | | | |
|---|---|---|---|
| 6,179,485 B1 * | 1/2001 | Harrington | 358/1.9 |
| 7,136,188 B2 | 11/2006 | Kondo | |
| 7,589,730 B1 | 9/2009 | Brown | |
| 7,925,100 B2 * | 4/2011 | Howell et al. | 382/232 |
| 2005/0105148 A1 * | 5/2005 | Misawa | 358/537 |
| 2005/0174587 A1 * | 8/2005 | Hara | 358/1.9 |
| 2007/0279705 A1 | 12/2007 | Takiyama et al. | |
| 2008/0204769 A1 | 8/2008 | Hoshino | |
| 2011/0102822 A1 * | 5/2011 | Aoki | 358/1.9 |
| 2011/0131483 A1 * | 6/2011 | Aoki | 715/234 |

FOREIGN PATENT DOCUMENTS

| | | |
|---|---|---|
| JP | 5-197815 A | 8/1993 |
| JP | 2002-112055 A | 4/2002 |
| JP | 2005-70957 A | 3/2005 |
| JP | 2006-48215 A | 2/2006 |
| JP | 2007-323611 A | 12/2007 |

OTHER PUBLICATIONS

PDF Reference second edition, Adobe Portable Document Format Version 1.3, Abobe Systems Incorporated, First printing, Jul. 2000, pp. 136, 141-143.

* cited by examiner

*Primary Examiner* — Twyler Haskins
*Assistant Examiner* — Dennis Dicker
(74) *Attorney, Agent, or Firm* — Birch, Stewart, Kolasch & Birch, LLP

(57) ABSTRACT

It is judged whether a dashed line pattern needs to be divided into a plurality of auxiliary dashed line patterns or not based on the configuration of the dashed line pattern. If it is decided that the dashed line pattern needs to be divided, an operator group which is descriptive of the dashed line pattern is replaced with a plurality of operator groups which are descriptive of the auxiliary dashed line patterns, respectively.

8 Claims, 15 Drawing Sheets

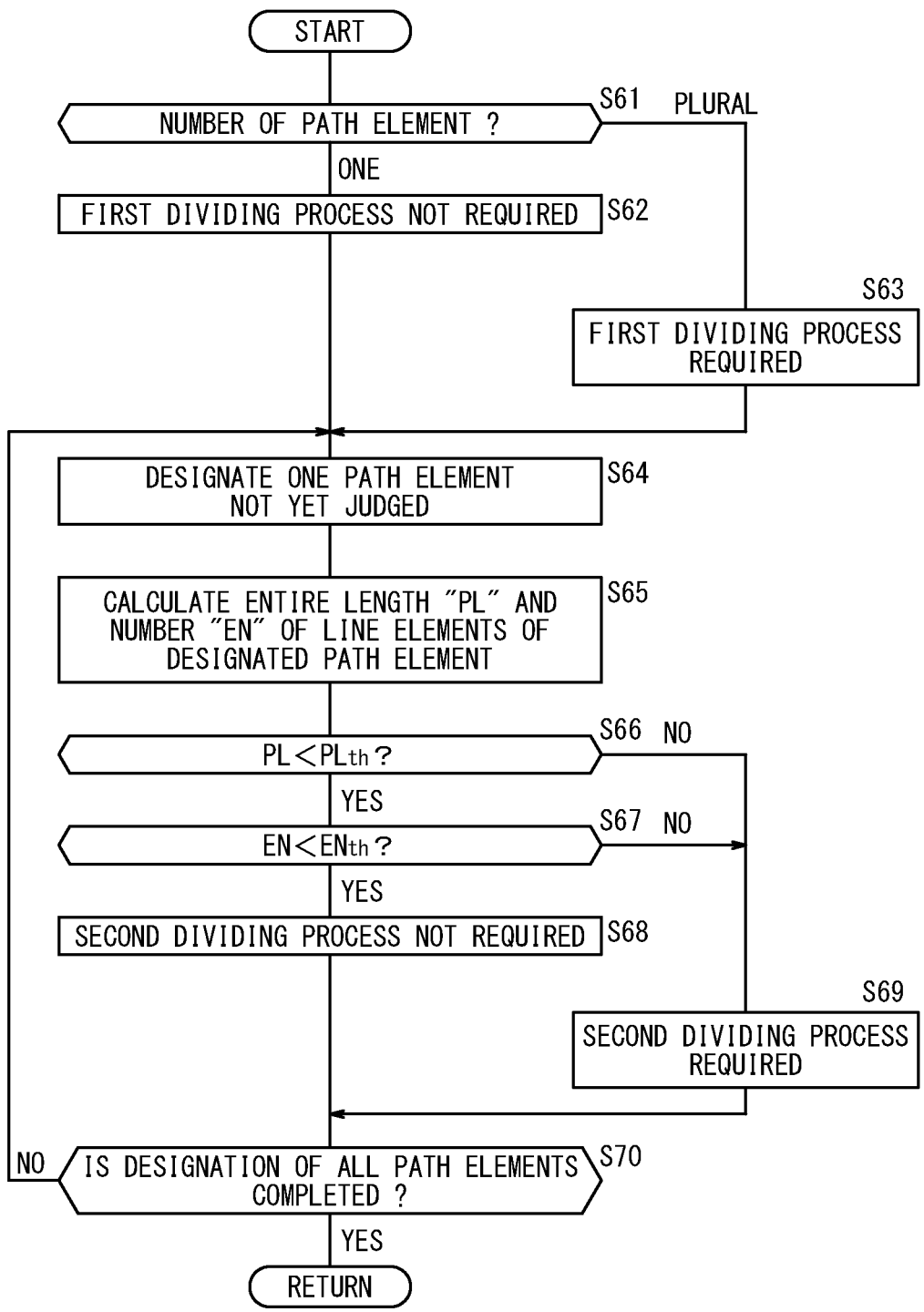

START POINT OF PATHEND POINT OF PATH

PAGE DESCRIPTION DATA PROCESSING APPARATUS, PAGE DESCRIPTION DATA PROCESSING METHOD, PRINT PRODUCING METHOD, AND RECORDING MEDIUM

CROSS-REFERENCE TO RELATED APPLICATION

This application is based upon and claims the benefit of priority from Japanese Patent Application No. 2011-044906 filed on Mar. 2, 2011, of which the contents are incorporated herein by reference.

BACKGROUND OF THE INVENTION

1. Field of the Invention

The present invention relates to a page description data processing apparatus, a page description data processing method, a print producing method, and a recording medium for performing a particular processing sequence on page description data having a certain attribute, among page description data described by a page description language (PDL), thereby to convert the page description data into more robust page description data (hereinafter referred to as "robustized page description data").

2. Description of the Related Art

In recent years, DTP (DeskTop Publishing) processes for setting characters and images generated by the user with a computer into an electronic page using DTP application software installed in the computer have been widely used in the printing and platemaking fields.

The DTP application software generates page description data which express images of respective pages based on elements such as characters and images edited by the user.

The page description data are vector data independent of the resolution etc. of an output machine such as a printer, a platesetter, or the like, and cannot be output per se from the output machine. Therefore, the page description data are rasterized by a RIP (Raster Image Processor) into raster image data comprising a cluster of dots representative of elements such as characters and images in pages.

If the raster image data are supplied to the output machine such as a printer, a platesetter, or the like, the output machine outputs a hard copy or a printing plate carrying an image based on the raster image data (see Japanese Laid-Open Patent Publication No. 2005-070957).

PDF (Portable Document File) version 1.3, which is one type of page description data, incorporates a "dashed line pattern" operator for controlling a pattern of line elements and gaps in stroking a linear path. The term "path" refers to a path which has no line width by itself and which interconnects a start point and an end point. The term "stroke" refers to a process of applying a certain line width to a path.

Variables that can be set by the "dashed line pattern" operator include "dashed line array" for designating a length for line elements and gaps that appear alternately and "dashed line phase" for designating a painted state at the start point of a dashed line pattern which is periodic. For details, reference should be made to PDF Reference, second edition, Adobe Portable Document Format Version 1.3, first printing, July 2000, Author: Adobe Systems Incorporated, ISBN 0-201-61588-6, pages 136, 141-143. "Dashed line array" and "dashed line phase" may hereinafter be collectively referred to as "dashed line configuration parameters".

SUMMARY OF THE INVENTION

The relationship between dashed line configuration parameters and a dashed line pattern that is actually painted will be described in detail below based on an example in which a linear path is stroked with 11 unit lengths from the start point to the end point thereof with reference to FIG. 15A of the accompanying drawings.

For example, in FIG. 15A, [4 2] {0} means the coupling of parameters as a dashed line array [4 2] and a dashed line phase {0}. The dashed line array [4 2] represents the turning-on of 4 successive unit lengths, followed by the turning-off of 2 successive unit lengths. In other words, the dashed line pattern has a periodicity unit represented by 6 unit lengths. Stated otherwise, the dashed line pattern comprises a repetition of line elements each 4 unit lengths long and gaps each 2 unit lengths long.

The dashed line phase {0} indicates that the above periodic dashed line pattern has a phase shift of 0. The periodic dashed line pattern which has the dashed line phase {0} is illustrated in an upper section of FIG. 15A. A periodic dashed line pattern which has a dashed line phase {1} is illustrated in a middle section of FIG. 15A. The periodic dashed line pattern which has the dashed line phase {1} is equivalent to the periodic dashed line pattern which has the dashed line phase {0} as shifted one unit length to the left (toward the start point of the path). Similarly, a periodic dashed line pattern which has a dashed line phase {2} as illustrated in a lower section of FIG. 15A is equivalent to the periodic dashed line pattern which has the dashed line phase {0} as shifted two unit lengths to the left (toward the start point of the path).

According to the PDF specifications, as illustrated above, the painted configuration of a dashed line pattern is sequentially determined based on a prescribed periodic repetition from the start point to the end point of the dashed line pattern.

However, the PDF specifications above are susceptible to unexpected problems if a dashed line pattern generated along a linear path is rasterized. For example, if a dashed line pattern is generated along a linear path, as the number of repetitions of line elements and gaps increases, processing errors caused by RIP processing algorithms or software versions are accumulated, tending to generate line elements indeterminately in the vicinity of the end point of the path. The problem will specifically be described below with reference to FIGS. 15B and 15C of the accompanying drawings.

In FIG. 15B, it is assumed that an end point 202a of a line element 200a and an end point 202b of a line element 200b are positionally different from each other due to a processing error. A start point 206a of a line element 204a next to the line element 200a exists in a position beyond an end position 208 of the path, i.e., on the right side of the end position 208, and a start point 206b of a line element 204b next to the line element 200b exists in a position not beyond the end position 208 of the path, i.e., on the left side of the end position 208.

FIG. 15C shows an upper dashed line made up of the line element 200a and the next line element 204a and a lower dashed line made up of the line element 200b and the next line element 204b, the dashed lines being given a certain line width by a stroking process.

As shown in FIG. 15C, a filled area 210a is formed around the line element 200a, and a filled area 210b is also formed around the line element 200b according to a line width and a capping format (end processing format) which are preset in the stroking process.

However, no filled area is formed around the next line element 204a following the start point 206a (the upper dashed line) because the start point 206a is positioned outside the path. On the other hand, a filled area 212 of oblong shape is formed around a portion of the next line element 204b following the start point 206b (the lower dashed line) because the start point 206b is positioned within the path. Therefore, as shown in FIGS. 15B and 15C, a dashed line pattern of one path length may be converted into an unintended dashed line configuration.

If image data including a dashed line pattern are rasterized, such an unintended dashed line configuration may possibly cause an unexpected printing difficulty which is difficult to analyze to identify its cause. This problem manifests itself particularly in a case where the length of a line element is small.

It is an object of the present invention to provide a page description data processing apparatus, a page description data processing method, a print producing method, and a recording medium which make it possible to prevent print difficulties from occurring in a process of rasterizing image data including a dashed line pattern.

According to the present invention, there is provided a page description data processing apparatus comprising a particular painting object identifier for identifying whether there is a particular painting object for painting a dashed line pattern among entered page description data or not, a division judging section for judging whether the dashed line pattern needs to be divided into a plurality of auxiliary dashed line patterns or not based on configuration of the dashed line pattern, if the particular painting object identifier decides that there is the particular painting object, and an operator replacer for replacing an operator group which is descriptive of the dashed line pattern with a plurality of operator groups which are descriptive of the auxiliary dashed line patterns, respectively, if the division judging section decides that the dashed line pattern needs to be divided.

Since the page description data processing apparatus includes the division judging section for judging whether the dashed line pattern is to be divided into a plurality of auxiliary dashed line patterns or not based on the configuration of the dashed line pattern, and the operator replacer for replacing an operator group which is descriptive of the dashed line pattern with a plurality of operator groups which are descriptive of the auxiliary dashed line patterns, respectively, the number of repetitive is reduced, thereby preventing processing errors from being accumulated and hence preventing line elements from being generated indeterminately in the vicinity of the end point of a path, during a rasterizing process of an RIP. In this manner, a printing difficulty is prevented from being caused if print data including a dashed line pattern are rasterized.

Preferably, the division judging section decides that the dashed line pattern needs to be divided if a path along the dashed line pattern is made up of a plurality of path elements.

Preferably, the division judging section decides that the dashed line pattern needs to be divided if the length of a path along the dashed line pattern exceeds a first threshold value.

Preferably, the division judging section decides that the dashed line pattern needs to be divided if the number of line elements making up the dashed line pattern exceeds a second threshold value.

Preferably, the operator replacer replaces the operator group which is descriptive of the dashed line pattern with a plurality of operator groups which are descriptive of the auxiliary dashed line patterns, respectively, which are joined together at a gap between line elements of the dashed line pattern.

According to the present invention, there is also provided a page description data processing method comprising the steps of identifying whether there is a particular painting object for painting a dashed line whether the dashed line pattern needs to be divided into a plurality of auxiliary dashed line patterns or not based on configuration of the dashed line pattern, if it is decided that there is the particular painting object, and replacing an operator group which is descriptive of the dashed line pattern with a plurality of operator groups which are descriptive of the auxiliary dashed line patterns, respectively, if it is decided that the dashed line pattern needs to be divided.

According to the present invention, there is further provided the print producing method comprising a proofing step of outputting a proof image based on page description data to be printed, and a processing step of processing the page description data before the proofing step is performed, using the above page description data processing method.

According to the present invention, there is also provided a recording medium storing therein a program for controlling a computer to inspect an attribute of entered page description data and perform a process depending on the inspected attribute on the page description data, the program enabling the computer to function as a particular painting object identifier for identifying whether there is a particular painting object for painting a dashed line pattern among the entered page description data or not, a division judging section for judging whether the dashed line pattern needs to be divided into a plurality of auxiliary dashed line patterns or not based on configuration of the dashed line pattern, if the particular painting object identifier decides that there is the particular painting object, and an operator replacer for replacing an operator group which is descriptive of the dashed line pattern with a plurality of operator groups which are descriptive of the auxiliary dashed line patterns, respectively, if the division judging section decides that the dashed line pattern needs to be divided.

With the page description data processing apparatus, the page description data processing method, the print producing method, and the recording medium according to the present invention, it is judged whether a dashed line pattern needs to be divided into a plurality of auxiliary dashed line patterns or not based on the configuration of the dashed line pattern. If it is decided that the dashed line pattern needs to be divided, an operator group which is descriptive of the dashed line pattern is replaced with a plurality of operator groups which are descriptive of the auxiliary dashed line patterns, respectively. Consequently, the number of repetitive line elements and gaps that make up the dashed line pattern is reduced, thereby preventing processing errors from being accumulated and hence preventing line elements from being generated indeterminately in the vicinity of the end point of a path, during a rasterizing process of an RIP. In this manner, a printing difficulty is prevented from being caused if print data including a dashed line pattern are rasterized.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 10 is a flowchart of a process of judging whether a dashed line pattern needs to be divided or not in step S6 of the operation sequence shown in FIG. 3;

DESCRIPTION OF THE PREFERRED EMBODIMENT

A publishing system which incorporates a page description data processing apparatus, a page description data processing method, a print producing method, and a recording medium according to an embodiment of the present invention will be described in detail below with reference to the accompanying drawings.

Figure 1:
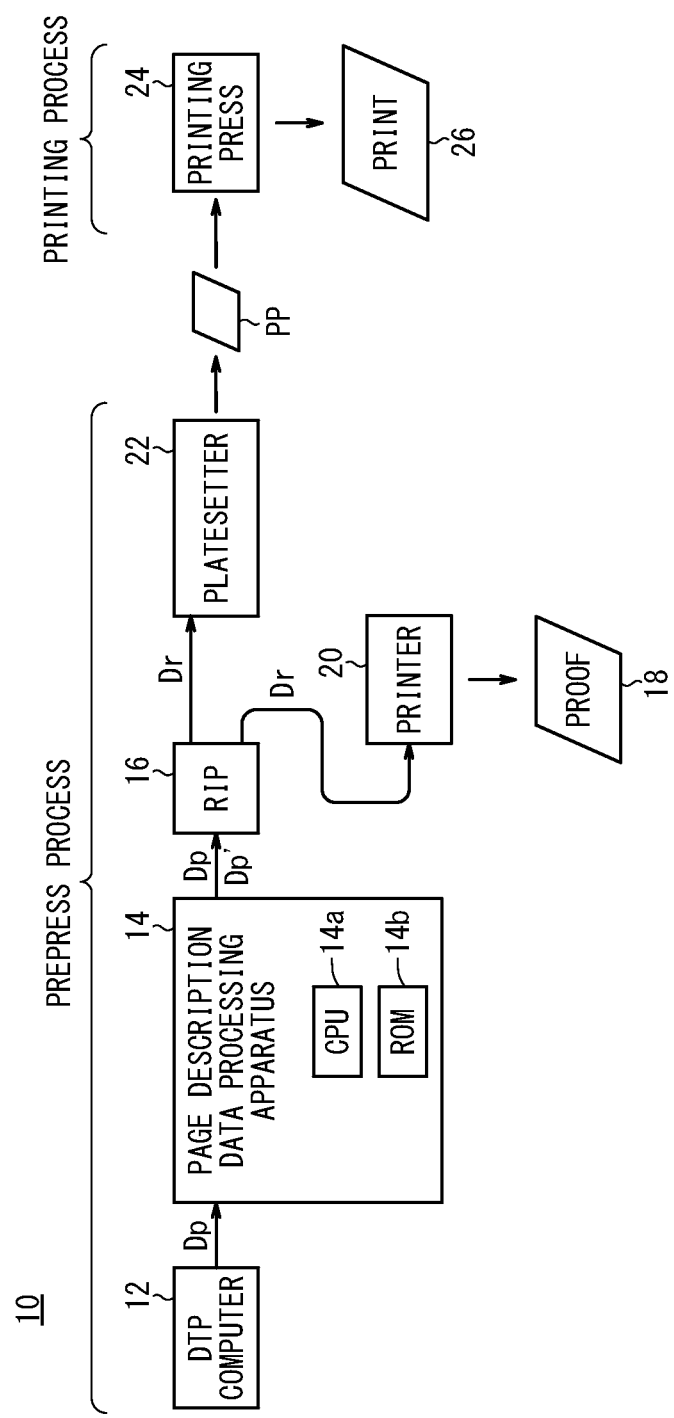
FIG. 1 is a block diagram of a publishing system which carries out a page description data processing method according to an embodiment of the present invention.

FIG. 1 is a block diagram of a publishing system 10 which carries out a page description data processing method according to an embodiment of the present invention.

As shown in FIG. 1, the publishing system 10 is arranged to perform a prepress process, a printing process, and a bookbinding process (not shown).

The prepress process includes a DTP computer 12, a page description data processing apparatus 14 such as a personal computer or the like, an RIP 16, a printer 20, and a platesetter 22.

The DTP computer 12 generates page description data Dp which express images of respective pages according to a page description language based on elements such as characters and images edited by the user.

The page description data processing apparatus 14 checks the contents (attributes) of the page description data Dp output from the DTP computer 12, performs a particular processing sequence on the page description data Dp having a certain attribute based on the checked contents, and generates the processed page description data Dp as robustized page description data Dp' or outputs page description data Dp free of the certain attribute. The processing function of the page description data processing apparatus 14 may be incorporated in the DTP computer 12, so that the page description data processing apparatus 14 can be dispensed with.

The RIP 16 converts the page description data Dp or the robustized page description data Dp' output from the page description data processing apparatus 14 into raster image data Dr in C, M, Y, K.

Based on the raster image data Dr, the printer 20 prints a proof 18 (proof image) as a hard copy.

If the proof 18 printed by the printer 20 is judged as acceptable by the user, then the platesetter 22 generates and outputs printing plates PP in C, M, Y, K from the raster image data Dr output from the RIP 16 after the user has turned on the start switch of the platesetter 22.

The printing process includes a printing press 24. The printing press 24 has printing plates PP in C, M, Y, K mounted therein which carry respective inks in C, M, Y, K and transfer them to a sheet of paper, thereby producing a print 26 in multiple colors (four colors).

Figure 2:
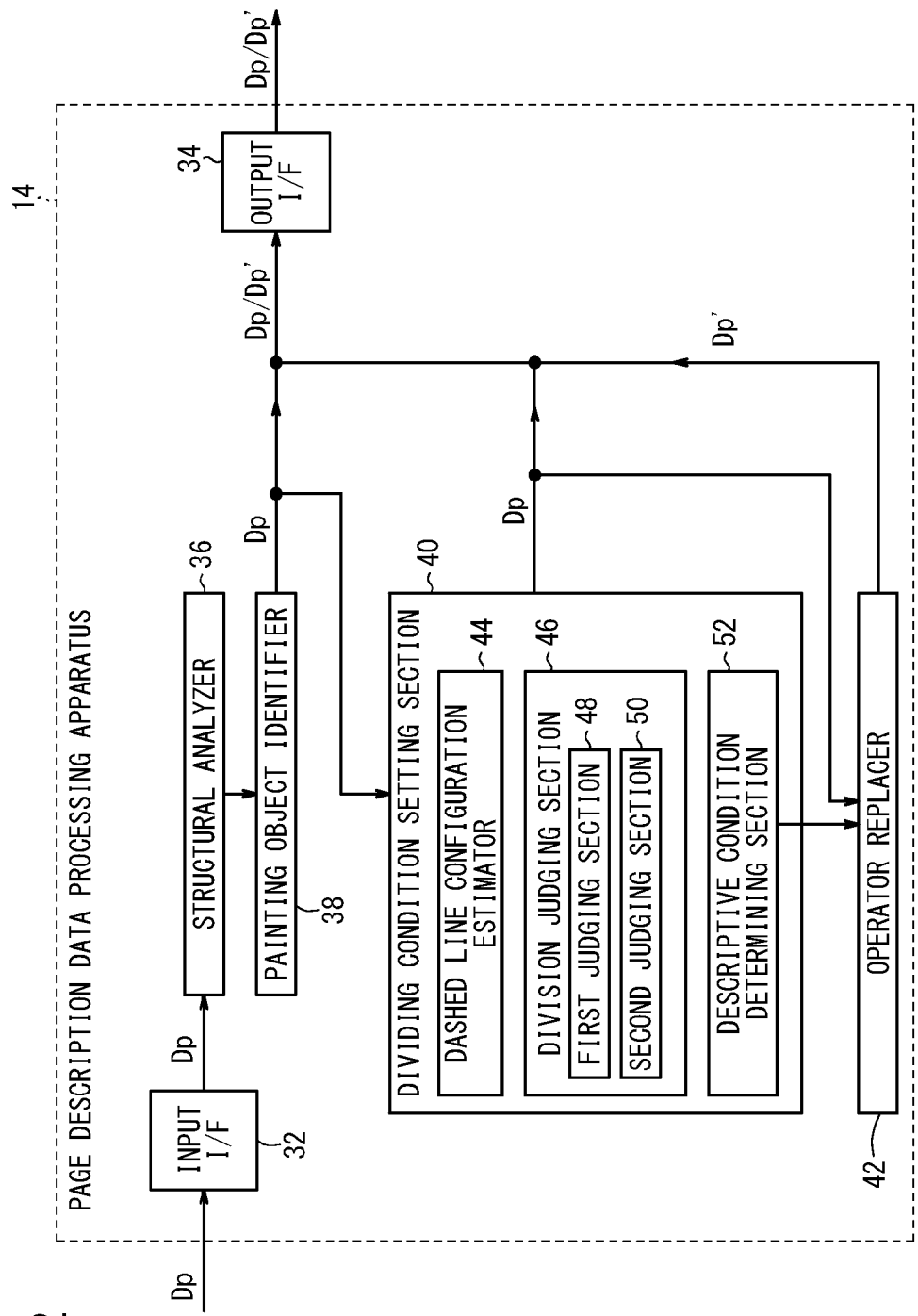
FIG. 2 is a functional block diagram of a page description data processing apparatus of the publishing system shown in FIG. 1.

FIG. 2 is a functional block diagram of the page description data processing apparatus 14. The page description data processing apparatus 14 has functions that are performed if a CPU 14a (see FIG. 1) thereof executes a program stored in a ROM 14b (see FIG. 1) thereof.

The program may be recorded in a computer-readable recording medium such as the ROM 14b, a hard disk, a CD-ROM, or the like, and the program recorded in the recording medium may be read and run by a computer system. The computer system includes an OS and hardware such as a CPU and peripheral devices. The computer-readable recording medium also includes a medium for dynamically holding programs for a short period of time, such as a communication line for transmitting programs via a network such as the Internet or the like or a communication channel such as a telephone line, or a memory for holding programs for a certain period of time such as a volatile memory in a computer system which serves as a server or a client in a network environment.

The page description data processing apparatus 14 generates robustized page description data Dp' by analyzing page description data Dp supplied via an input interface (input I/F) 32 or generates unchanged page description data Dp, and outputs the robustized page description data Dp' or the unchanged page description data Dp via an output interface (output I/F) 34.

The page description data processing apparatus 14 includes, in addition to the input and output interfaces 32, 34, a structural analyzer 36 for analyzing the structure of the page description data Dp, a painting object identifier 38 (particular painting object identifier) for identifying whether there is an object painting a dashed line pattern (hereinafter referred to as "particular painting object") or not, a dividing condition setting section 40 for setting a dividing condition for a dashed line pattern (including whether a dashed line pattern needs to be divided or not) if it is decided that there is a particular painting object, and an operator replacer 42 for replacing an operator group which is descriptive of a painting object if it is decided that a dashed line pattern needs to be divided.

The term "painting object" used herein refers to each component in two-dimensional graphics (or three-dimensional graphics, and is a concept narrower than the term "object" used in the technical field of software engineering. The term "operator group" shall include not only a set of operators, but also a single operator.

The dividing condition setting section 40 includes a dashed line configuration estimator 44 for estimating the configuration of a dashed line pattern (the configuration of line elements), a division judging section 46 (including a first judging section 48 and a second judging section 50) for judging whether a dashed line pattern is to be divided into a plurality of auxiliary dashed line patterns or not, and a descriptive condition determining section 52 for determining descriptive conditions for the auxiliary dashed line patterns.

The publishing system 10 is basically constructed as described above. Operation of the page description data processing apparatus 14 of the publishing system 10 will be described below with reference to a flowchart shown in FIG. 3 and the functional block diagram shown in FIG. 2.

Figure 3:
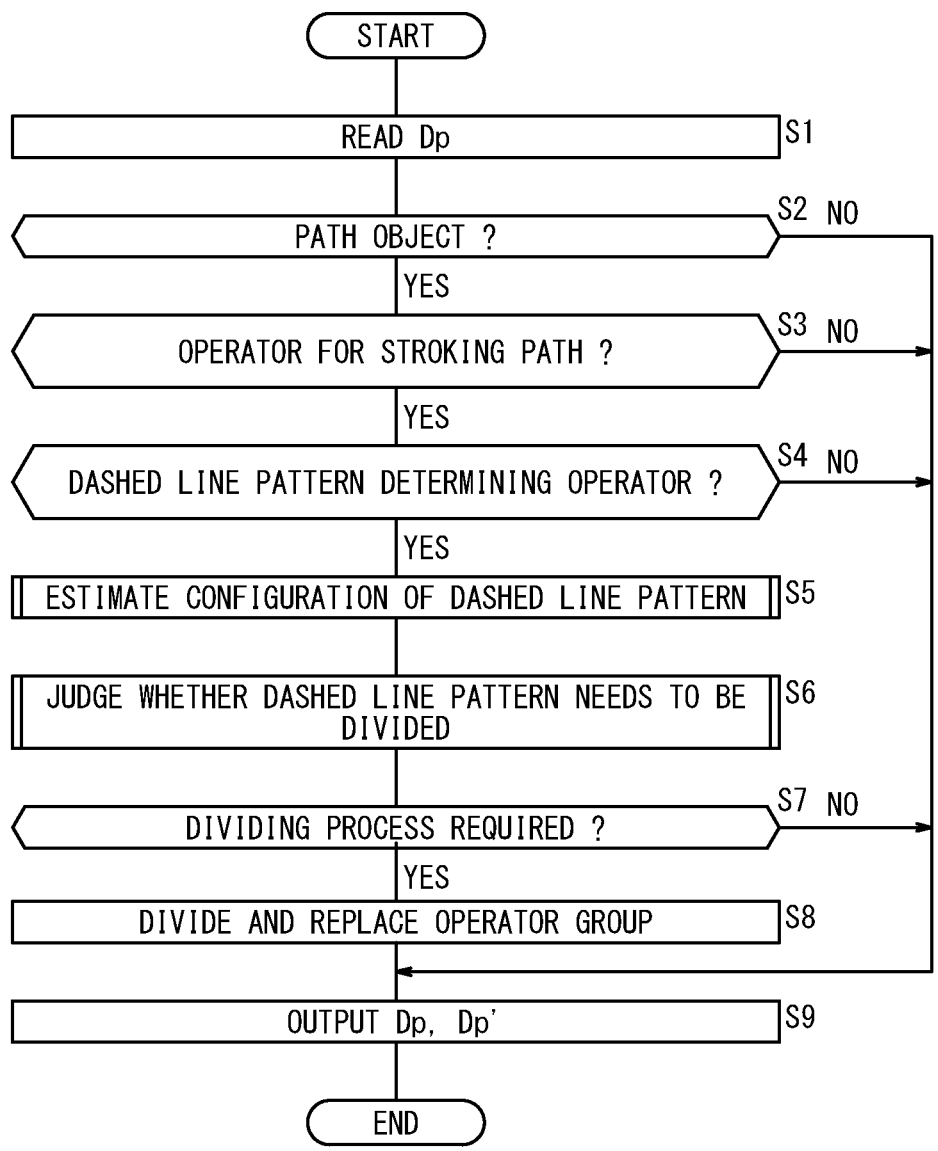
FIG. 3 is a flowchart of an operation sequence of the page description data processing apparatus.

In step S1 shown in FIG. 3, the page description data processing apparatus 14 reads page description data Dp, page by page, which are output from the DTP computer 12.

In step S2, the structural analyzer 36 analyzes the structure of the page description data Dp and extracts a painting object contained in the pages. Thereafter, the painting object identifier 38 confirms whether a path object is contained in the extracted painting object or not. If a path object is not contained in the extracted painting object, then the page description data processing apparatus 14 outputs the page description data Dp unchanged via the output interface 34 in step S9.

The term "path object" used herein refers to an arbitrary configuration made up of a linear line, a rectangle, and a curve, e.g., a cubic Bezier curve.

If it is confirmed that a path object is contained in the extracted painting object in step S2, then the painting object identifier 38 confirms whether a stroking operator is contained in the path object or not in step S3. The term "stroking operator" used herein refers to an operator for finishing a path object, and is an operator for applying a line width to a current path to draw a line. An operator for filling a closed space generated by a current path is referred to as "filling operator". The "stroking operator" and the "filling operator" may collectively be referred to as "path paint operator".

The painting object identifier 38 confirms whether a stroking operator, e.g., an operator "S", "s", or the like, is contained in the path object or not in step S3. If a stroking operator is not contained in the path object, or in other words, if a filling operator "f", F", or the like, is contained in the path object, then the page description data processing apparatus 14 outputs the page description data Dp unchanged via the output interface 34 in step S9.

If a stroking operator is contained in the path object in step S3, then the painting object identifier 38 confirms whether a dashed line pattern determining operator is contained in the path object or not in step S4. The term "dashed line pattern determining operator" refers to an operator for setting a process for describing a dashed line pattern if a path is stroked.

According to the PDF, there is defined one such operator "d". Variables that are defined which can be set by the operator "d" include "dashed line array" for designating a length for individual line elements and gaps that appear alternately and "dashed line phase" for designating a leading position as the start point of a dashed line. The case in which the "dashed line pattern determining operator" is not included or does not exist, covers not only the fact that the operator itself does not exist, but also the fact that a variable representing a solid line is set in the operator, indicating that the pattern involved is not a dashed line pattern.

The painting object identifier 38 confirms whether an operator "d", for example, is contained in the path object or not in step S4. If an operator "d" is not contained in the path object, then the page description data processing apparatus 14 outputs the page description data Dp unchanged via the output interface 34 in step S9.

The dashed line configuration estimator 44 estimates the configuration of a dashed line pattern generated along a path in step S5. Specifically, the dashed line configuration estimator 44 estimates the positions of start and end points of a plurality of line elements that make up the dashed line pattern. A process of estimating the positions of start and end points of a plurality of line elements in a user space (device-independent coordinate system) will be described in detail below with reference to a flowchart shown in FIG. 4.

Figure 4:
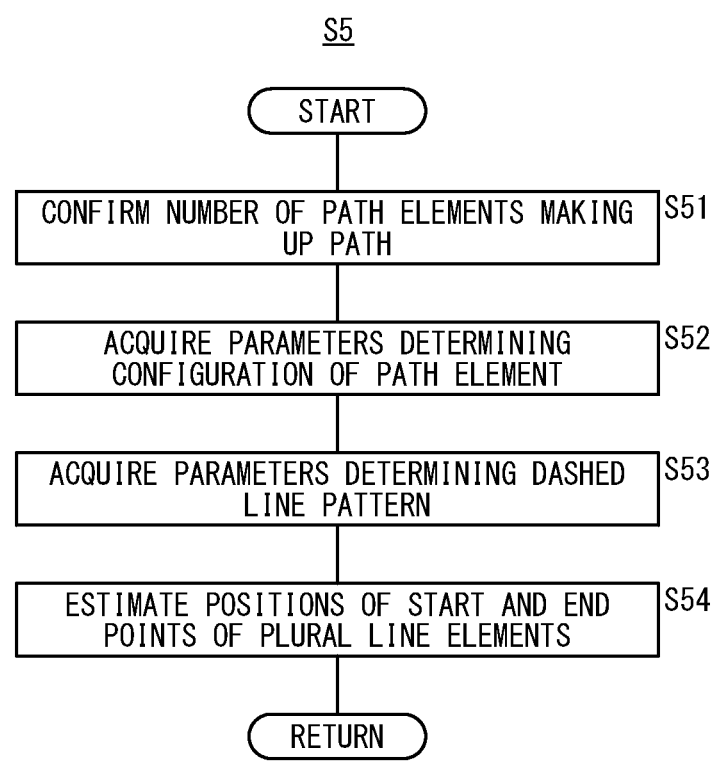
FIG. 4 is a flowchart of a process of estimating the shape of a dashed line pattern in step S5 of the operation sequence shown in FIG. 3.

In step S51 shown in FIG. 4, the dashed line configuration estimator 44 confirms the number of path elements that make up a path along a dashed line pattern. The term "path element" refers to a basic unit for constructing one path. Specifically, the dashed line configuration estimator 44 confirms the number of path construction operators that exist between an operator that determines the start point (origin) of the path and a stroking operator.

The term "term "path construction operator" used herein refers to an operator for defining the physical configuration of a path. According to the PDF, there are defined seven such operators "m", "l", "c", "v", "y", "h", and "re". The path construction operators include a "linear path construction operator" (one linear path construction operator "l") for adding a straight line to a current path, and "curved path construction operators" (three curved path construction operators "c", "v", "y") for adding a curve to a current path. The term "current path" refers to a present path that is present in a range to which a path painting process (a stroking process or a filling process) is applied.

Figure 5:
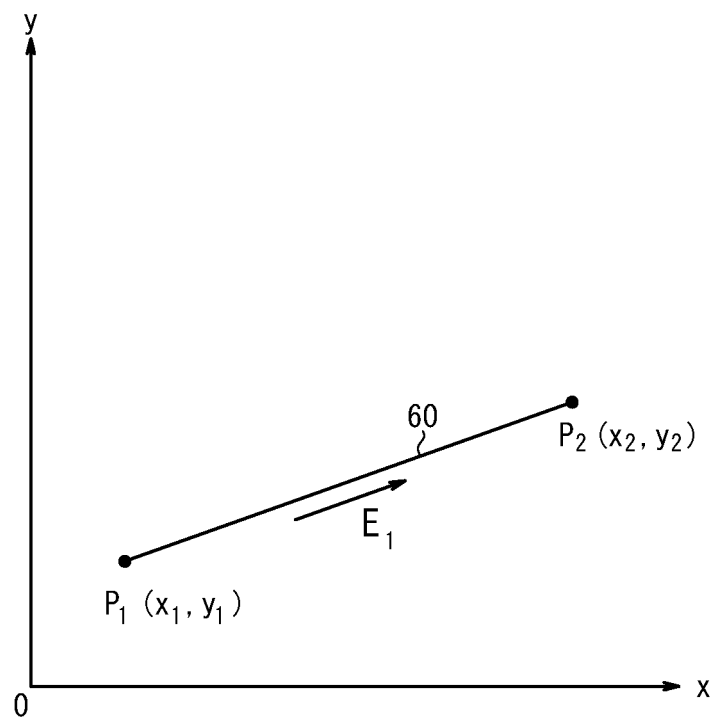
FIG. 5 is a diagram showing a linear path element that is generated by a linear stroke operator.

FIG. 5 is a diagram showing a linear path element 60 that is generated by the linear path construction operator (operator "l"). The linear path element 60 is defined by a start point $P_1$ $(x_1, y_1)$ and an end point $P_2$ $(x_2, y_2)$.

The path element 60 which interconnects the start point $P_1$ and the end point $P_2$ is generated by changing the value of a variable t from 0 to 1. The coordinates P (x(t), y(t)) of a point on the path element 60 depending on the variable t are calculated according to the following equations (1), (2):

$$x(t) = (1-t)x_1 + tx_2 \qquad (1)$$

$$y(t) = (1-t)y_1 + ty_2 \qquad (2)$$

Since $x(0)=x_1$, $y(0)=y_1$, $x(1)=x_2$, and $y(1)=y_2$ from the equations (1), (2), if the variable t changes from 0 to 1, the point P on the path element 60 moves continuously from the start point $P_1$ to the end point $P_2$ along the direction indicated by the arrow $E_1$ shown in FIG. 5.

Figure 6:
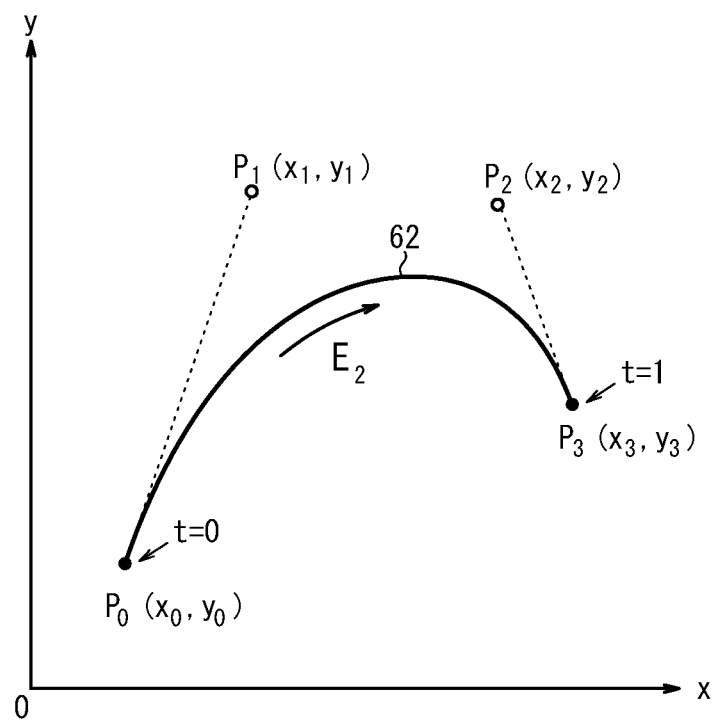
FIG. 6 is a diagram showing a curved path element represented by a cubic Bezier curve that is generated by a curve stroke operator.

FIG. 6 is a diagram showing a path element 62 of a cubic Bezier curve that is generated by a curved path construction operator (operator "c"). The path element 62 is defined by two terminal points $P_0$ $(x_0, y_0)$, $P_3$ $(x_3, y_3)$ and two control points $P_1$ $(x_1, y_1)$, $P_2$ $(x_2, y_2)$.

The path element 62 which interconnects the start point $P_0$ and the end point $P_3$ is generated if a variable t changes from 0 to 1. The coordinates P(x(t), y(t)) of a point P on the path element 62 depending on the variable t are calculated by the following equations (3), (4):

$$x(t) = (1-t)^3 x_0 + 3t(1-t)^2 x_1 + 3t^2(1-t)x_2 + t^3 x_3 \qquad (3)$$

$$y(t) = (1-t)^3 y_0 + 3t(1-t)^2 y_1 + 3t^2(1-t)y_2 + t^3 y_3 \qquad (4)$$

Since $x(0)=x_0$, $y(0)=y_0$, $x(1)=x_3$, and $y(1)=y_3$ from the equations (3), (4), if the variable t changes from 0 to 1, the point P on the path element 62 moves continuously from the start point $P_0$ to the end point $P_3$ along the direction indicated by the arrow $E_2$. A line segment $P_0P_1$ indicated by the broken line is a line tangential to the path element 62 at the start point $P_0$, and a line segment $P_2P_3$ indicated by the broken line is a line tangential to the path element 62 at the end point $P_3$.

Figure 7A:
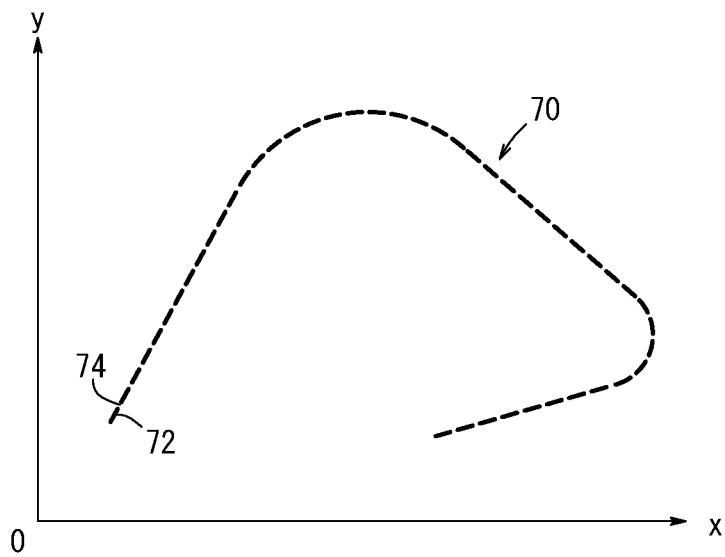
FIG. 7A is a diagram showing a dashed line pattern along a curve by way of example.

FIG. 7A is a diagram showing a dashed line pattern 70 along a curve by way of example. As shown in FIG. 7A, the dashed line pattern 70 is made up of line elements 72 and gaps 74 (non-line elements) that are disposed alternately.

Figure 7B:
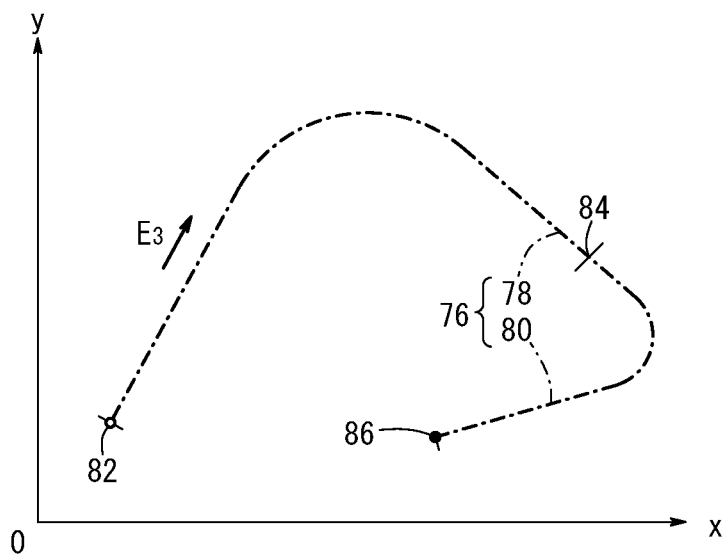
FIG. 7B is a diagram showing the configuration of a path along the dashed line pattern shown in FIG. 7A.

FIG. 7B is a diagram showing the configuration of a path 76 along the dashed line pattern 70 shown in FIG. 7A. The path 76 (indicated by the dot-and-dash line) as a current path is made up of a path element 78 expressed as a cubic Bezier curve and a path element 80 expressed as a cubic Bezier curve.

The start point of the path element 78 corresponds to a start point 82 (indicated by a blank round sign (open circle)) of the path 76, and the end point of the path element 78 corresponds to a middle point 84 of the path 76. The start point of the path element 80 corresponds to the middle point 84, and the end point of the path element 80 corresponds to an end point 86 (indicated by a solid round sign (solid circle)) of the path 76.

In the examples shown in FIGS. 7A and 7B, the dashed line configuration estimator 44 confirms the two path elements 78, 80 from the dashed line pattern 70. A path is not limited to curved path elements joined together, but may be curved and linear path elements joined together or linear path elements joined together. Moreover, a path may be made up of three or more path elements joined together.

In step S52, the dashed line configuration estimator 44 acquires parameters for determining a path from a path construction operator. In the example shown in FIG. 5, these parameters include the operator attribute ("1"), the start point $P_1$ $(x_1, y_1)$, and the end point $P_2$ $(x_2, y_2)$. In the example shown in FIG. 6, these parameters include the operator attribute ("c", "v", or "y"), the start point $P_0$ $(x_0, y_0)$, the end point $P_3$ $(x_3, y_3)$, the control point $P_1$ $(x_1, y_1)$, and the control point $P_2$ $(x_2, y_2)$.

In step S53, the dashed line configuration estimator 44 acquires parameters for determining the dashed line pattern 70. In this embodiment, these parameters include "dashed line array" and "dashed line phase" (dashed line configuration parameters) set in the operator "d".

In step S54, the dashed line configuration estimator 44 estimates the positions of start and end points of a plurality of line elements 72. A process of estimating the positions of the start and end points of a plurality of line elements 72 in the user space (device-independent coordinate system) will be described in detail below.

If the coordinates of the point P on the path elements 60, 62 are represented by $(x(t), y(t))$ (see FIGS. 5 and 6), then the length $I(u, v)$ of the path elements 60, 62 in an interval $[u, v]$ is calculated according to the following equation (5):

$$I(u,v)=\int_u^v \sqrt{\{x'(t)\}^2+\{y'(t)\}^2}dt \quad (5)$$

where $0 \le u \le 1$, $0 \le v \le 1$. The positions of the start and end points of the line element 72 can be estimated based on the equation (5).

An operation sequence of the dashed line configuration estimator 44 for estimating the positions of the start and end points of the line elements 72 in the example of the linear path element 60 shown in FIG. 5 will be described below.

Figure 8A:
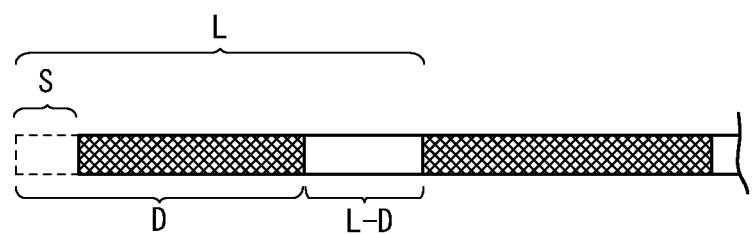
FIG. 8A is a diagram showing dashed line configuration parameters by way of example.

As shown in FIG. 8A, it is assumed that dashed line configuration parameters are set by [D L–D] {S} where D, L, S are positive numbers which may be of not only integer values but also real values.

Figure 8B:
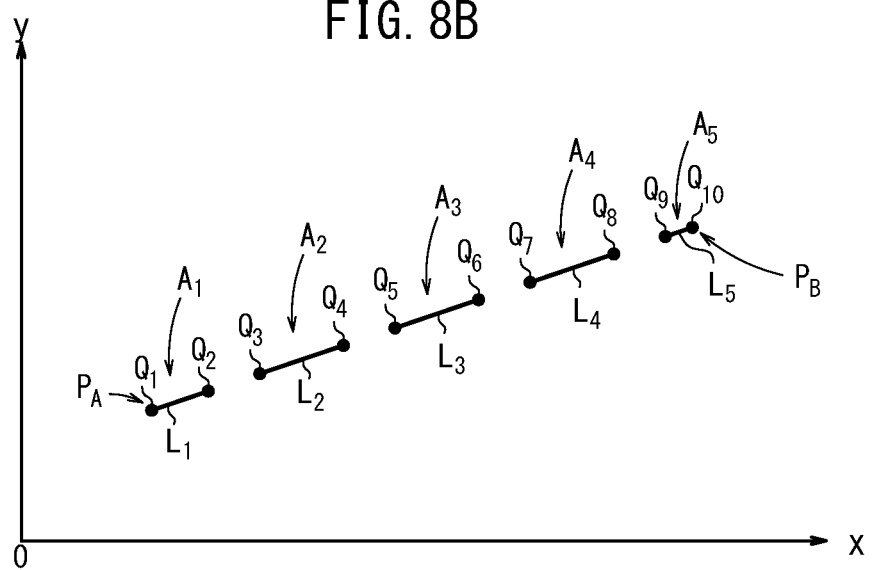
FIG. 8B is a diagram showing a dashed line pattern which is generated along the linear path element shown in FIG. 5.

As shown in FIG. 8B, the configurations of five line elements $A_1$ through $A_5$, or specifically, the positions of start points $\{Q_1, Q_3, Q_5, Q_7, Q_9\}$ and end points $\{Q_2, Q_4, Q_6, Q_8, Q_{10}\}$ thereof, can be estimated based on the start point $P_A$ $(x_1, y_1)$, the end point $P_B$ $(x_2, y_2)$, and the above dashed line configuration parameters of the path element 60. A process of estimating the configurations of five line elements $A_1$ through $A_5$ will be described in detail below.

First, the position of the start point $Q_1$ of the line element $A_1$, which has a length $L_1$, as a painting start position, can be estimated as the position $(t_1=0)$ of the start position $P_A$ of the path element 60. Then, $t_2$ which satisfies $I(t_1, t_2)=D-S$ is calculated, and a position corresponding to $t=t_2$ is calculated according to the equations (1), (2). The position of the end point $Q_2$ of the line element $A_1$ can be estimated as a position $(x(t_2), y(t_2))$.

Then, $t_3$ which satisfies $I(t_2, t_3)=L-D$ is calculated, and a position corresponding to $t=t_3$ is calculated according to the equations (1), (2). The position of the start point $Q_3$ of the line element $A_2$, which has a length $L_2$, can be estimated as a position $(x(t_3), y(t_3))$. Then, $t_4$ which satisfies $I(t_3, t_4)=D$ is calculated, and a position corresponding to $t=t_4$ is calculated according to the equations (1), (2). The position of the end point $Q_4$ of the line element $A_2$ can be estimated as a position $(x(t_4), y(t_4))$.

Similarly, the coordinates of the start points $\{Q_1, Q_3, Q_5, Q_7, Q_9\}$ and the end points $\{Q_2, Q_4, Q_6, Q_8, Q_{10}\}$ are estimated.

An operation sequence of the dashed line configuration estimator 44 for estimating the positions of the start and end positions of line elements in the example of the curved path element 62 shown in FIG. 6 will be described below.

Figure 9:
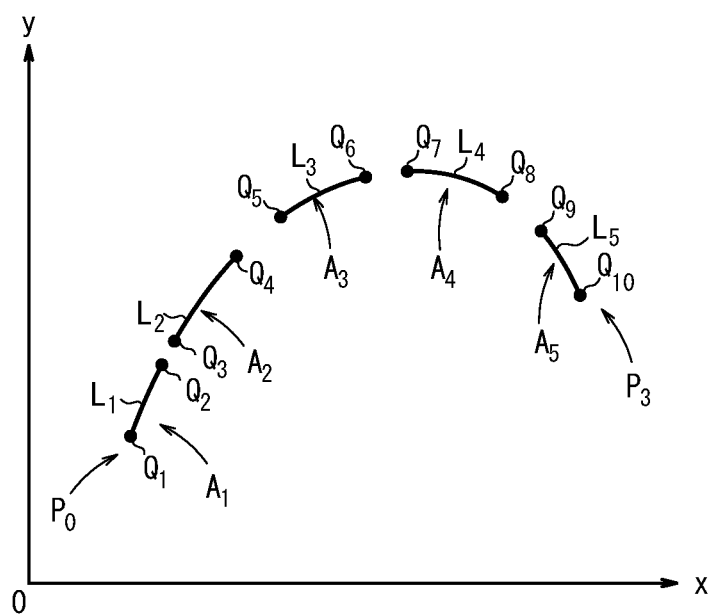
FIG. 9 is a diagram showing a dashed line pattern which is generated along the curved path element shown in FIG. 6.

As shown in FIG. 9, the configurations of five line elements $A_1$ through $A_5$, or specifically, the coordinates of start points $\{Q_1, Q_3, Q_5, Q_7, Q_9\}$ and end points $\{Q_2, Q_4, Q_6, Q_8, Q_{10}\}$ thereof, can be estimated based on the start point $P_0$ $(x_0, y_0)$, the end point $P_3$ $(x_3, y_3)$, and the above dashed line configuration parameters of the path element 62. A process of estimating the configurations of five line elements $A_1$ through $A_5$ will be described in detail below.

First, the position of the start point $Q_1$ of the line element $A_1$, which has a length $L_1$, as a painting start position, can be estimated as the position $(t_1=0)$ of the start point $P_A$ of the path element 62. Then, $t_2$ which satisfies $I(t_1, t_2)=D-S$ is calculated, and a position corresponding to $t=t_2$ is calculated according to the equations (3), (4). The position of the end point $Q_2$ of the line element $A_1$ can be estimated as a position $(x(t_2), y(t_2))$.

Then, $t_3$ which satisfies $I(t_2, t_3)=L-D$ is calculated, and a position corresponding to $t=t_3$ is calculated according to the equations (3), (4). The position of the start point $Q_3$ of the line element $A_2$, which has a length $L_2$, can be estimated as a position $(x(t_3), y(t_3))$. Then, $t_4$ which satisfies $I(t_3, t_4)=D$ is calculated, and a position corresponding to $t=t_4$ is calculated according to the equations (3), (4). The position of the end point $Q_4$ of the line element $A_2$ can be estimated as a position $(x(t_4), y(t_4))$.

Similarly, the coordinates of the start points $\{Q_1, Q_3, Q_5, Q_7, Q_9\}$ and the end points $\{Q_2, Q_4, Q_6, Q_8, Q_{10}\}$ are estimated.

With respect to the path 76 made up of path elements 78, 80 in the example shown in FIG. 7B, the start and end points of each of the line elements 72 can be estimated according to the above process. Specifically, the start and end points of the line elements 72 may successively be estimated in the interval from the start point 82 to the end point 86 of the path 76 in the order of path elements 78 and path elements 80. In this manner, the dashed line configuration estimator 44 estimates the configuration of the dashed line pattern 70 generated along the path 76 in step S5.

In step S6 shown in FIG. 3, the division judging section 46 judges whether the dashed line pattern 70 is to be divided into a plurality of auxiliary dashed line patterns or not based on the configuration of the dashed line pattern 70. Specifically, the division judging section 46 judges whether a "first dividing process" for dividing a dashed line pattern along a plurality of path elements into a plurality of auxiliary dashed line patterns is required or a "second dividing process" for dividing a dashed line pattern made up of one path element into a plurality of auxiliary dashed line patterns is required. A process of judging whether the dashed line pattern 70 needs to be divided or not will be described in detail below with reference to a flowchart shown in FIG. 10.

In step S61 shown in FIG. 10, the first judging section 48 judges the number of path elements that make up the path 76. If there is one path element making up the path 76, then the first judging section 48 decides that the first dividing process is not required in step S62. If there are a plurality of path elements making up the path 76, then the first judging section 48 decides that the first dividing process is required in step S63 as a first dividing condition is satisfied. This is because if the path 76 is made up of a plurality of path elements joined together, then the path 76 is highly likely to be long in its entirety.

In step S64, the second judging section 50 designates one path element which has not yet been judged. The designated path element will hereinafter referred to as "designated path element". In an initial state, the path elements 78, 80 of the path 76 serve as candidates for the designated path element.

Figure 11A:
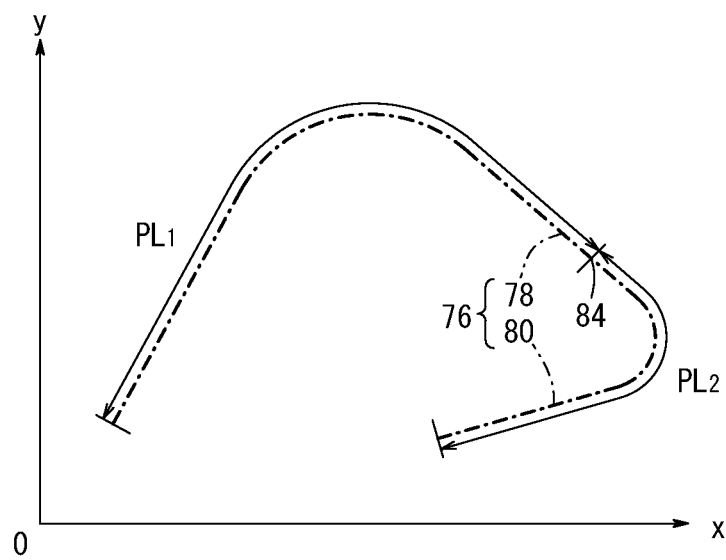
FIGS. 11A and 11B are diagrams illustrative of a process of judging whether a second dividing process is required or not.
Figure 11B:
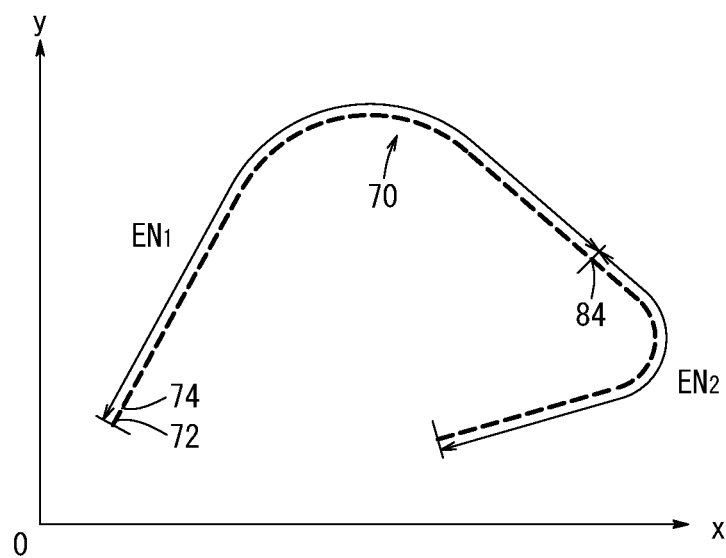

In step S65, the second judging section 50 refers to the configuration estimated by the dashed line configuration estimator 44, and calculates the entire length PL and the number EN of line elements of the designated path element. It is assumed that, as shown in FIG. 11A, the entire lengths of the path elements 78, 80 are $PL_1$, $PL_2$, respectively, and the numbers of line elements on the path elements 78, 80 are $EN_1$, $EN_2$, respectively.

In step S66, the second judging section 50 compares the entire length PL of the designated path element with a threshold value PLth (first threshold value). If PL<PLth, then control goes to step S67.

In step S67, the second judging section 50 compares the number EN of line elements of the designated path element with a threshold value ENth (second threshold value). If EN<ENth, then the second judging section 50 decides that the second dividing process is not necessary in step S68.

If at least one of the conditions PL PLth (step S66) and EN≥ENth (step S67) is satisfied, then the second judging section 50 decides that the second dividing process is necessary in step S69 as a second dividing condition is satisfied. This is because if a number of line elements 72 is highly likely to be generated on the path element.

The threshold value PLth and/or the threshold value ENth may be a fixed value or may be changed depending on the output resolution of the printing press 24.

In step S70, the second judging section 50 judges whether the designation of all the path elements is completed or not. If the second judging section 50 decides that the designation of all the path elements is not completed, then control goes back to step S64 to repeat steps S64 through S69. In this manner, the division judging section 46 judges whether the dashed line pattern 70 is to be divided into a plurality of auxiliary dashed line patterns or not based on the configuration of the dashed line pattern 70 in step S6.

In step S7 shown in FIG. 3, if no dividing process is required, i.e., if neither the first dividing condition nor the second dividing condition is satisfied, then the page description data processing apparatus 14 outputs the page description data Dp unchanged via the output interface 34 in step S9.

In step S8, the operator replacer 42 performs a process of dividing and replacing an operator group. Prior to such a dividing and replacing process, the descriptive condition determining section 52 determines descriptive conditions for describing auxiliary dashed line patterns depending on the judged result from the division judging section 46. Specifically, the descriptive condition determining section 52 determines not only the start point, end points, and configuration of a path along the auxiliary dashed line patterns, but also dashed line configuration parameters (dashed line array and dashed line phase). Thereafter, the operator replacer 42 replaces an operator group describing the dashed line pattern 70 in the page description data Dp with a plurality of operator groups describing a plurality of auxiliary dashed line patterns, using the descriptive conditions acquired from the dividing condition setting section 40 (descriptive condition determining section 52).

The description of an example in which specific source codes of the page description data Dp, Dp' are replaced will be skipped below. Instead, a process of painting the dashed line pattern 70 after the first dividing process is carried out will be described below with reference to FIGS. 12A through 13B.

Figure 12A:
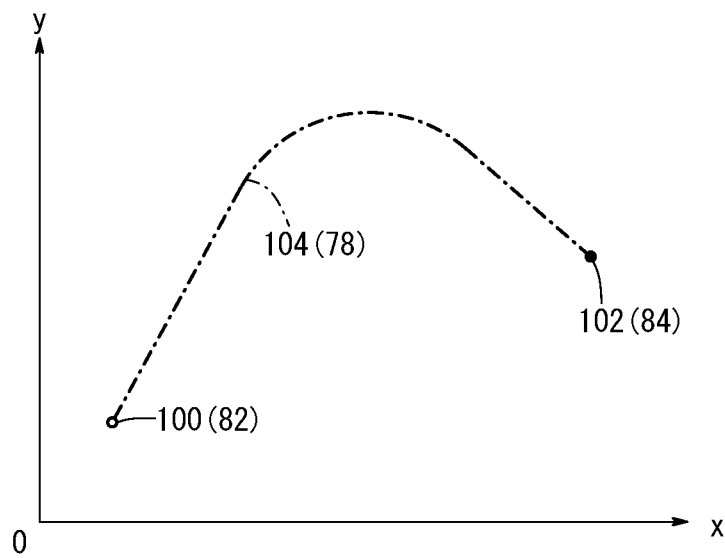
FIGS. 12A and 12B are first diagrams showing a sequence of painting a dashed line pattern after the dividing processes according to the present invention.

In FIG. 12A, a current path 104 extending from a start point 100 to an end point 102 is established. The current path 104 has a configuration in conformity with the configuration of the path element 78 shown in FIG. 7B. Specifically, the start point 100 is positionally in conformity with the start point 82 (see FIG. 7B), and the end point 102 is positionally in conformity with the middle point 84 (see FIG. 7B).

Figure 12B:
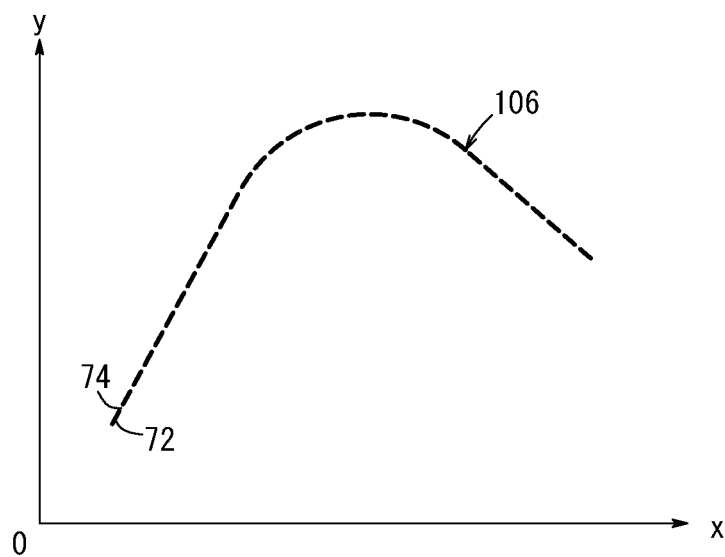

The current path 104 is stroked using appropriate dashed line configuration parameters, thereby painting an auxiliary dashed line pattern 106 made up of a plurality of line elements 72 and a plurality of gaps 74, as shown in FIG. 12B.

Figure 13A:
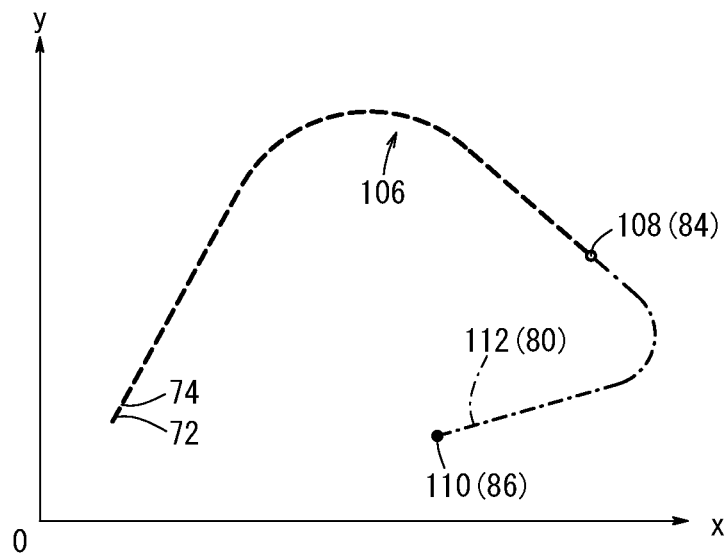
FIGS. 13A and 13B are second diagrams showing a sequence of painting a dashed line pattern after the dividing processes according to the present invention.

In FIG. 13A, a current path 112 extending from a start point 108 to an end point 110 is established. The current path 112 has a configuration in conformity with the configuration of the path element 80 shown in FIG. 7B. Specifically, the start point 108 is positionally in conformity with the middle point 84 (see FIG. 7B), and the end point 110 is positionally in conformity with the end point 86 (see FIG. 7B).

Figure 13B:
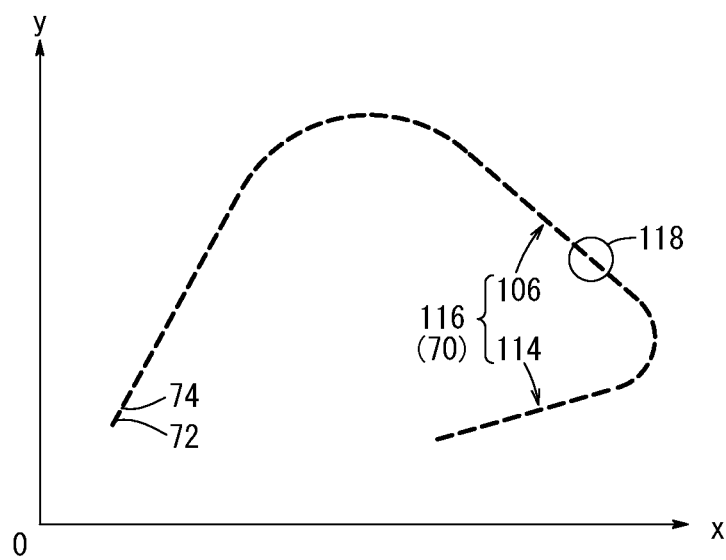

The current path 112 is stroked using appropriate dashed line configuration parameters, thereby painting an auxiliary dashed line pattern 114 made up of a plurality of line elements 72 and a plurality of gaps 74, as shown in FIG. 13B.

The auxiliary dashed line patterns 106, 114 are appropriately joined together into a dashed line pattern 116 which is essentially in conformity with the dashed line pattern 70 (see FIG. 7A). A joint 118 between the terminal end of the auxiliary dashed line pattern 106 and the beginning end of the auxiliary dashed line pattern 114 can be generated seamlessly by appropriately setting the "dashed line phase" of the auxiliary dashed line pattern 114.

Figure 14:
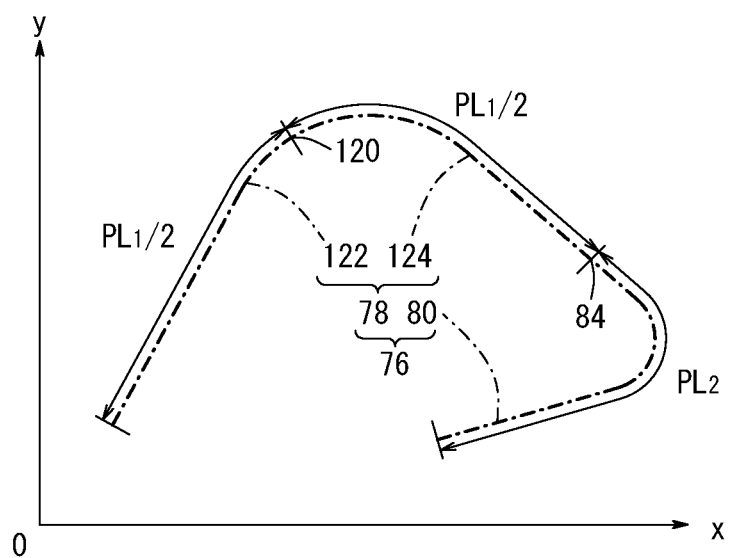
FIG. 14 is a diagram showing another divided path by way of example.
Figure 15A:
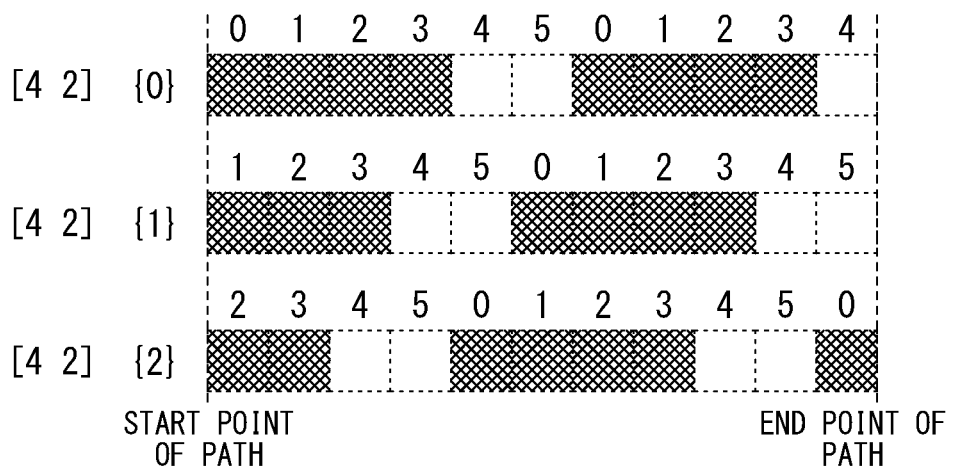
FIG. 15A is a diagram showing the relationship between dashed line configuration parameters and a dashed line pattern that is actually painted.
Figure 15B:
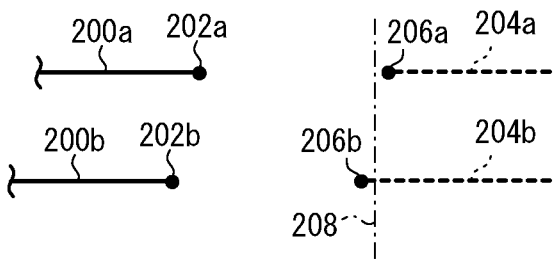
FIGS. 15B and 15C are diagrams showing dashed line patterns generated by giving a certain line width to linear paths according to a stroking process.
Figure 15C:
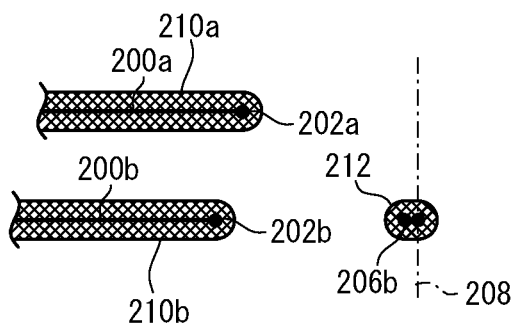

FIG. 14 is a diagram showing another divided path 76 by way of example. FIG. 14 shows the path 76 divided after the first dividing process and the second dividing process are performed thereon.

The path 76 is made up of path elements 78, 80. The path element 78 is divided into two equal path segments at a middle point 120. The path element 78 is thus made up of a path element 122 expressed as a cubic Bezier curve and a path element 124 expressed as a cubic Bezier curve, which are joined together. The entire length of the path element 122 is in agreement with the entire length of the path element 124 (=PL$_1$/2), satisfying the relationship of PL$_1$/2<PLth (see step S66 shown in FIG. 10).

In the second dividing process, the path 76 may not be divided into equal path segments, and may be divided into three or more path segments. The number of path segments into which the path 76 is divided may be changed depending on the length of the path 76 (or the path elements 78, 80). If the path 76 is divided such that the path elements are joined together at a gap 74, not a line element 72 of the dashed line pattern 70, then the length of line elements 72 at the seam is prevented from varying due to an error.

In step S9 shown in FIG. 3, the page description data processing apparatus 14 outputs the path description data Dp' representing the dashed line pattern 70 which is divided into a plurality of auxiliary dashed line patterns 106, 114 by the operator replacer 42.

In this manner, as shown in FIG. 1, the path description data Dp that are input to the page description data processing apparatus 14 are supplied as they are (Dp) or as path description data (Dp') processed by the operator replacer 42 to the RIP 16.

As a result, after the auxiliary dashed line pattern 106 (see FIG. 12B) is painted, the auxiliary dashed line pattern 114 (see FIG. 13B) is painted, thereby producing the dashed line pattern 116 which is equivalent to the dashed line pattern 70 (see FIGS. 7A, 13B). The page description data Dp can be output stably even if they include a particular dashed line pattern.

The page description data processing apparatus 14 includes the division judging section 46 for judging whether the dashed line pattern 70 is to be divided into a plurality of auxiliary dashed line patterns 106, 114 or not based on the configuration of the dashed line pattern 70, and the operator replacer 42 for replacing an operator group which is descriptive of the dashed line pattern 70 (particular painting object) with a plurality of operator groups which are descriptive of the auxiliary dashed line patterns 106, 114, respectively. Thus, the number of repetitive line elements 72 and gaps 74 that make up the dashed line pattern 70 is reduced, thereby preventing processing errors from being accumulated and hence preventing line elements 72 from being generated indeterminately in the vicinity of the end point 86 of the path 76, during the rasterizing process of the RIP 16. In this manner, a printing difficulty is prevented from being caused if print data including a dashed line pattern are rasterized.

The page description data processing method according to the present embodiment may be carried out before the proof image (proof 18, etc.) is output from the printer 20 or a display device based on the page description data Dp to be printed. The dashed line pattern 70 that is painted according to the RIP processing sequence at the time a proof image is generated and the dashed line pattern 70 that is painted according to the RIP processing sequence at the time printing plates are produced or a print is produced are thus in general agreement with each other. In other words, a printing difficulty is prevented from being caused if the page description data Dp including the particular dashed line pattern 70 are rasterized. In particularly, if a plurality of RIP processing sequences are to be performed during the process of producing the print 26, then page description data processing method according to the present embodiment should preferably be carried out as upstream as possible in the printing process.

While the page description data according to the PDF have been described above, the present invention is not limited to the PDF, but is also applicable to other page description languages such as PostScript (registered trademark) of Adobe Systems Incorporated and XPS (XML Paper Specification).

Although a certain preferred embodiment of the present invention has been shown and described in detail, it should be understood that various changes and modifications may be made therein without departing from the scope of the appended claims.

What is claimed is:

1. A page description data processing apparatus comprising:
   a particular painting object identifier for identifying whether there is a particular painting object for painting a dashed line pattern which is periodic so that a line element and a gap appear alternately, among entered page description data or not;
   a division judging section for judging whether the dashed line pattern needs to be divided into a plurality of auxiliary dashed line patterns or not based on configuration of the dashed line pattern, if the particular painting object identifier decides that there is the particular painting object; and
   an operator replacer for replacing an operator group which is descriptive of the dashed line pattern with a plurality of operator groups which are descriptive of the auxiliary dashed line patterns, respectively, if the division judging section decides that the dashed line pattern needs to be divided.

2. The page description data processing apparatus according to claim 1, wherein the division judging section decides that the dashed line pattern needs to be divided if a path along the dashed line pattern is made up of a plurality of path elements.

3. The page description data processing apparatus according to claim 1, wherein the division judging section decides that the dashed line pattern needs to be divided if the length of a path along the dashed line pattern exceeds a first threshold value.

4. The page description data processing apparatus according to claim 1, wherein the division judging section decides that the dashed line pattern needs to be divided if the number of the line elements exceeds a second threshold value.

5. The page description data processing apparatus according to claim 1, wherein the operator replacer replaces the operator group which is descriptive of the dashed line pattern with a plurality of operator groups which are descriptive of the auxiliary dashed line patterns, respectively, which are joined together at the gap.

6. A page description data processing method, the method enabling a computer to perform the steps of:
   identifying whether there is a particular painting object for painting a dashed line pattern which is periodic so that a line element and a gap appear alternately, among entered page description data or not;
   judging whether the dashed line pattern needs to be divided into a plurality of auxiliary dashed line patterns or not based on configuration of the dashed line pattern, if it is decided that there is the particular painting object; and
   replacing an operator group which is descriptive of the dashed line pattern with a plurality of operator groups which are descriptive of the auxiliary dashed line patterns, respectively, if it is decided that the dashed line pattern needs to be divided.

7. The print producing method comprising:
   a proofing step of outputting a proof image based on page description data to be printed; and a processing step of processing the page description data before the proofing step is performed, using the page description data processing method according to claim 6.

8. A non-transitory recording medium storing therein a program for controlling a computer to function as:
 a particular painting object identifier for identifying whether there is a particular painting object for painting a dashed line pattern which is periodic so that a line element and a gap appear alternately, among the page description data or not;
 a division judging section for judging whether the dashed line pattern needs to be divided into a plurality of auxiliary dashed line patterns or not based on configuration of the dashed line pattern, if the particular painting object identifier decides that there is the particular painting object; and
 an operator replacer for replacing an operator group which is descriptive of the dashed line pattern with a plurality of operator groups which are descriptive of the auxiliary dashed line patterns, respectively, if the division judging section decides that the dashed line pattern needs to be divided.

* * * * *